Aug. 11, 1970   C. R. McCULLY   3,523,829
ELECTROCHEMICAL POWER SUPPLY REGENERATED BY HEAT
Filed Dec. 6, 1965
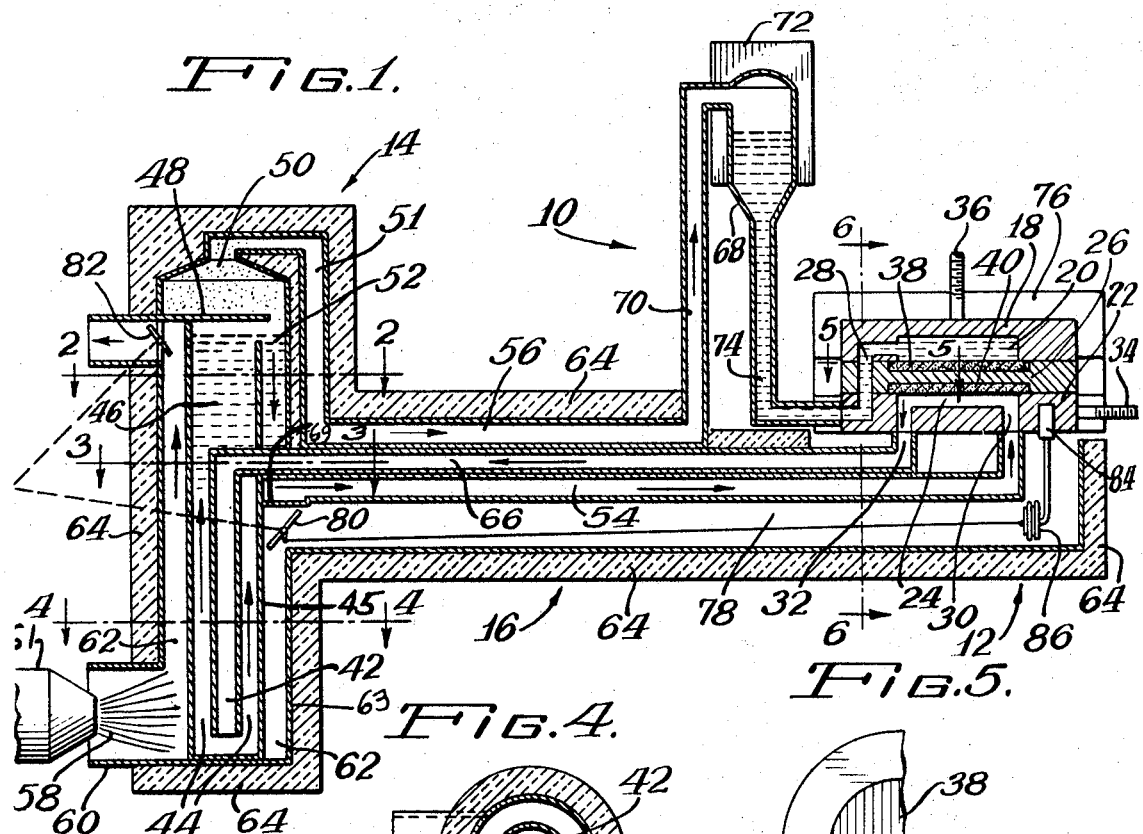
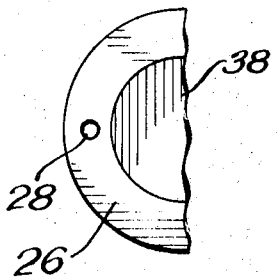
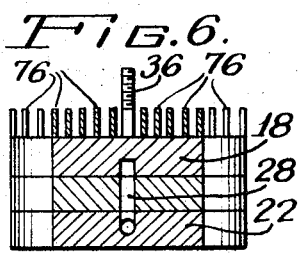
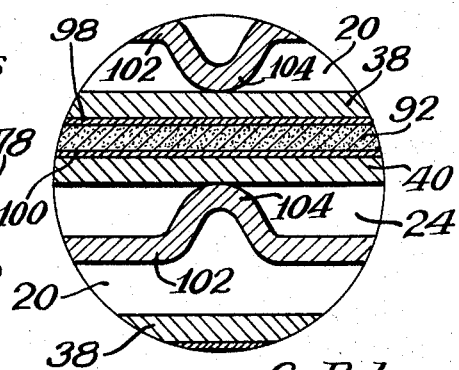
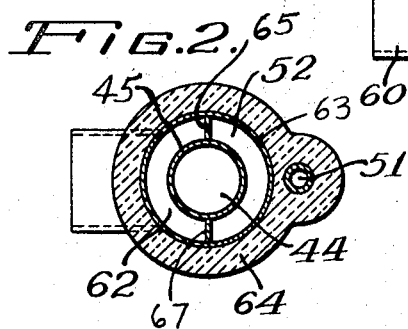
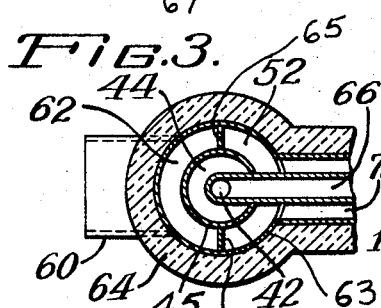
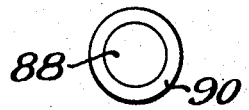
Inventor:
C. Roland McCully
By Bair, Freeman
& Molinare   Attys.

United States Patent Office 3,523,829
Patented Aug. 11, 1970

3,523,829
ELECTROCHEMICAL POWER SUPPLY REGENERATED BY HEAT
C. Roland McCully, Prospect Heights, Ill., assignor to Modine Manufacturing Company, a corporation of Wisconsin
Filed Dec. 6, 1965, Ser. No. 511,928
Int. Cl. H01m 27/30, 27/16
U.S. Cl. 136—86                        3 Claims

ABSTRACT OF THE DISCLOSURE

An electrochemical power supply device for supplying electrons to an external circuit in which means are provided for circulating an anode fluid to an anode chamber, means defining a cathode chamber containing a cathode gas, means for separating the anode fluid from the cathode gas by permitting the passage of ions formed from the cathode gas with the result that the anode fluid releases electrons to the anode chamber for passage to the cathode chamber by way of the external circuit. The cathode gas thereupon receives these electrons for forming ions therein and these ions combine with the anode fluid to form a partially modified anode fluid. In the device there are provided means for thermally disassociating the resulting partially modified anode fluid into the original anode fluid and the cathode material for recirculating in the manner defined above so that the device may be continually operated by continually disassociating the partially modified anode fluid that is produced in supplying the electrons.

---

This invention relates to a highly novel heat-regenerated electrochemical power supply device and it particularly relates to an electrochemical power supply device which converts chemical energy into electrical energy by means of a galvanic cell couple wherein the chemicals utilized are regenerated by heat.

Electrochemical power sources, such as batteries and fuel cells, have a common ability of converting chemical energy into electrical energy. Such known power sources, however, have certain drawbacks. Batteries, for example, are characterized by low specific energy, that is, watt hours per pound. As to fuel cells, they are bulky devices which are limited by practical requirements to the use of only a few fuels of high purity. Also, neither batteries nor fuel cells approach the performance range of internal combustion engines in specific energy or specific power, that, is, kilowatts per pound or kilowatts per cubic foot.

It is an object of this invention to provide an electrochemical power supply system in which the chemical reactants thereof are regenerated by heat.

It is a further important object of this invention to provide a novel heat-regenerated electromechanical power supply device which provides a highly compact power supply with specific power characteristics which are in the range of internal combustion engines and particularly in the range of power supply devices such as engine-generator sets.

It is yet another object of this invention to provide a novel heat-regenerated electrochemical power supply device wherein heat energy is the only required input and electrical energy and rejected heat are the only outputs.

It is also a further object of this invention to provide a unique heat-regenerated electrochemical power supply device wherein the specific energy thereof approaches 1200 watt hours per pound when the regenerating heat is from the burning of a hydrocarbon fuel.

Further purposes and objects of this invention will appear as the specification proceeds.

Particular embodiments of the present invention are illustrated in the accompanying drawings, wherein:

FIG. 1 is a diagrammatic, cross-sectional view of one embodiment of my unique power supply device which utilizes a single galvanic cell;

FIG. 2 is a sectional view taken along the line 2—2 of FIG. 1 particularly showing the internal structure of the upper portion of the regenerating section of the embodiment of FIG. 1;

FIG. 3 is a sectional view taken along the line 3—3 of FIG. 1, particularly showing the internal structure of the central portion of the regenerating section of the embodiment of FIG. 1;

FIG. 4 is a sectional view taken along the line 4—4 of FIG. 1, particularly showing the internal construction of the lower portion of the regenerating section of the embodiment of FIG. 1;

FIG. 5 is a sectional view taken along the line 5—5 of FIG. 1, particularly showing the membrane and collector used in the galvanic cell portion of the embodiment of FIG. 1;

FIG. 6 is a sectional view taken along the line 6—6 of FIG. 1, particularly showing the galvanic cell section of the embodiment of FIG. 1;

FIG. 7 is a diagrammatic top plan view of the construction of the electrolyte membrane used in the galvanic cell section of the embodiment of FIG. 1; and FIG. 8 is a greatly enlarged cross-sectional view of the preferred form of electrolyte membrane construction for the embodiment of FIG. 1.

Referring particularly to FIG. 1 of the drawings, my heat-regenerated electrochemical power supply device 10 is comprised of a galvanic cell section 12, a regenerating section 14, and a heat exchanger section 16 which interconnects the galvanic cell section 12 to the regenerator 14.

The galvanic cell 12 includes a cathode cap 18 having a recessed portion 20 therein which defines a cathode chamber. The galvanic cell 12 is also provided with an anode cup 22 which is recessed at 24 to define an anode chamber. A collector-electrolyte membrane 26 is interposed or sandwiched between the cathode cap 18 and anode cup 22 and serves to separate and electrically isolate or insulate the cathode cap 18 from the anode cup 22. In the illustrated embodiment cathode cap 18, anode cup 22, and membrane 26 are circular disc-like members having approximately the same outer diameter. The cathode cap 18, anode cup 22 and collector-electrolyte membrane 26 are retained in fluid-tight sealing relationship with respect to one another by any conventional means, such as for example insulated screw thread connection means. An inlet port or passage 28 for incoming cathode fluid to the cathode chamber 20 is provided in the anode cup 22 from which it extends upwardly through the electrolyte membrane 26, and then extends laterally into the cathode chamber 20 in the cathode cap. An upright anode inlet port 30 is defined in the anode cup 22 and communicates with the anode chamber 24 while a downwardly extending outlet 32, spaced from the inlet 30, is provided for the passage of spent anode fluid from the anode chamber 24. A negative terminal 34 is in electrical connection with the anode cup 22 while a positive terminal 36 is in electrical connection with the cathode cap 18. The electrolyte membrane 26 acts to electrically insulate the cathode cap 18 from the anode cup 22 and also forms a wall to effectively separate the anode chamber 24 from the cathode chamber so as to retain the anode fluid within the anode chamber 24 and the cathode fluid within the cathode chamber 20. The membrane 26 also provides ionic conduction between a cathode collector 38, located in a recess provided in the upper or cathode side of the electrolyte membrane 26, and an anode collector 40, which is positioned within a recess formed within the lower or anode side of the electrolyte membrane 26.

The regenerator 14 provides for entry of spent anode fluid therein through a central tubular upright duct 42 having an open lower end. The spent anode fluid passes downwardly in the tube 42 and then moves upwardly in the annular channel 44 surrounding the central duct 42 and defined by an enlarged tubular member 45 concentric with the duct 42. The channel 44 is closed at its lower end. The spent anode fluid moves upwardly in the annular chamber 44 until it reaches the upper portion 46 of the regenerator section 14. The spent anode fluid dissociates during this upward flow into the cathode gas and the regenerated anode fluid resulting from external heating. Separation occurs in the upper chamber 46, just below a baffle member 48, and the cathode gas passes upwardly beyond the baffle 48 and outwardly through the upper gas outlet 50, and the regenerated anode fluid, which passes downwardly into a semi-annular duct 52, then passes horizontally outwardly into the heat exchanger portion 16 through the horizontal duct 54. The cathode gas 50 passes downwardly in the vertical duct 51 from the outlet 50 and into the horizontal gas duct 56 of the heat exchanger 16. In order to assure that the anode chamber 24 always remains filled with anode fluid, the anode fluid in the upper portion 46 of the regenerator 14, just below the baffle 48, is vertically above the level of the electrolyte membrane 26 of the galvanic cell portion 12.

A flame or other suitable heat source 58 is introduced to the regenerator 14 through a heating duct 60 by a suitable nozzle 61 in the lower portion of the generator 14. An annular space 62 is provided around the tube 45 by an outer tubular member 63 so as to provide the necessary heat to effect dissociation of the spent anode fluid into the cathode gas and the regenerated anode fluid. Space 62 completely surrounds member 45, except at the upper end thereof, where upright separator walls 65 and 67, and horizontal wall 69 define the semiannular duct 52. The regenerator 14 as well as parts of the galvanic cell and the heat exchanger are surrounded by an insulating medium 64 so that heat losses are maintained at a minimum whereby the overall efficiency of the unit 10 is as high as possible.

The heat exchanger 16, disposed in a horizontal position, passes between the galvanic section 12 and the regenerator 14 so as to interconnect these sections of the unit 10. In the heat exchanger section 16, the spent anode fluid flowing from the outlet port 32 of the anode chamber 24 is relatively cool and moves towards the regenerator 14 and central duct 42 in passage 66, countercurrent to the flow of cathode gas through the horizontal cathode gas duct 56 in the heat exchanger 16 and also countercurrent to the flow of anode fluid through the horizontal anode fluid duct 54 of the heat exchanger 16. The ducts 54 and 56 are positioned closely adjacent to and on opposite sides of the passage 66 in order to provide for heat transfer from the relatively hot gas and hot anode fluid to the relatively cool spent anode fluid. The heat exchanger 16 effectively assists in the maintenance of the desired temperature differential between the galvanic cell portion 12 and the regenerator portion 14 by this heat exchange from the heated anode fluid and heated cathode gas to the cool spent anode fluid. The heat exchanger assists in maximizing the operating efficiency of the system 10 by cooling the anode fluid and cathode fluid flowing to the cell in ducts 54 and 56 respectively, and by preheating the spent anode fluid in duct 66 prior to dissociation thereof.

Prior to the passage of the cathode gas into the cathode chamber 20, the cathode gas passes upwardly into a reservoir 68 through an upright duct 70. The cathode gas is there condensed to a cathode liquid in the reservoir 68 and this condensation is assisted by cooling fins 72. This occurs by reason of the reservoir 68 and its cooling fins 72 being exposed, as shown in FIG. 1, to ambient. As discussed later herein the condensation is also promoted by the fact that the interior of the device including the reservoir 68 is subjected to elevated pressure such as 7 to 25 atmospheres. The cathode liquid then passes downwardly from the reservoir 68 through a duct 74 and then to the cathode inlet 28 for introduction of the cathode fluid into the cathode chamber 20. As the liquid passes to the inlet 28, the cathode liquid evaporates into the gaseous state so that when it passes into the cathode chamber 20 it is in the gaseous state. This evaporation assists in temperature control for the galvanic cell section 12. Heat transfer fins 76 on the outer surface of the cathode portion of the galvanic cell also assist in the desired temperature control. One of the important functions of the cathode liquid in the reservoir 68 and in the vertical duct 74 is that the pressure head of this liquid provides dynamic stability to reduce undesired electrolyte motion in the collector-electrolyte membrane 26.

Temperature during normal operation at the galvanic cell section 12 is desirably several tens of degrees above ambient temperatures to aid in heat rejection and to assure adequate ionic conduction through the collector-electrolyte membrane 26, and to assure that the anode liquid remains fluid. To assist in obtaining the desired temperature, particularly when the power supply unit 10 is initially started up from the cold state, a duct 78 at the entrance of the heat exchanger 16 conveys heat from the flame 58 to the galvanic cell 12. The amount of heat is regulated by suitable means, as damper 80 at the entrance of the duct 78 and a damper 82 in a vent in the upper portion of the vertical section of the heating duct 62 in the regenerator 14. The dampers are controlled by suitable means, as a temperature responsive element 84 and a sylphon 86.

Since the heat regenerated electrochemical power supply unit 10 has been described in detail, a general description of the operation and desired operating conditions of the device will be provided. The anode liquid is desirably in a lower oxidation state and attains a higher and more stable oxidation state upon giving up electrons to the anode collector 40 of the electrolyte-collector membrane 26. Electrons are transferred from the collector 40 to the anode cup 22, then to the negative terminal 34, through an external circuit or load (not shown), then to the positive terminal 36, to the cathode cap 18, to the cathode collector 38, and finally to the cathode gas which is on the cathode collector 38. This produces negative cathode ions which migrate to the anode chamber 24 through the electrolyte-collector membrane 26. The negative ions dissipate the charge caused by the removal of electrons as set forth in the above electrical circuit.

The spent anode fluid from the electrochemical combination of the cathode and anode material, passes through the outlet duct 32 through the heat exchanger 16 and to the upright central tubular duct 42. During this passage, the relatively cool spent anode fluid is preheated by heat exchange with the relatively hot cathode gas and regenerated anode fluid, both of which are flowing in a countercurrent direction. The preheated spent anode liquid passes downwardly in the central duct 42 and then upwardly through the annular chamber 44 where it is further heated by means of the surrounding heated annular space 62. As the spent anode fluid passes upwardly to the upper portion 46 of the regenerator 14, it is heated so that the spent anode liquid dissociates and separates into the cathode gas, which passes upwardly through the outlet 50, and the regenerated anode fluid which passes downwardly in the duct 52 and then outwardly through the horizontal fluid outlet duct 54. Similarly, the cathode gas passes through the horizontal outlet duct 56. During this passage through these ducts 54 and 56, the heat exchange with the spent anode liquid in the outlet duct 66 occurs. This preheating of the spent anode liquid assists in the efficient operation of the device 10. The cathode gas-passes upwardly through the upright duct 70 to the reservoir 68 where the gas becomes liquid, as previously described, and the liquid cathode passes downwardly through the duct 74. When the cathode liquid passes into the cathode inlet duct 28, it returns once again to the gaseous state. The anode liquid, meanwhile, passes to the anode inlet 30 for introduction to the anode chamber 24 to complete the cycle.

In a preferred highly satisfactory embodiment of the present invention, the anode fluid contains antimony in the plus three oxidation state (Sb III) and this electron donor atom achieves the plus five oxidation state (Sb V) upon releasing two electrons to the anode collector 40. The cathode gas and cathode liquid are principally chlorine and thus chloride ions or chloride bearing ions are formed upon accepting electrons from the cathode collector 38. Thus, the anode liquid can be considered to contain antimony trichloride while the spent anode liquid can be considered to contain antimony pentachloride. Nickel, Monel, and tantalum are examples of materials which are inert to system chemicals and are particularly suitable construction materials for contact with the anode fluids and with the cathode gas and cathode fluid. It is desirable that one or more of these metals are used for the internal surfaces of the galvanic cell 12, the regenerator 14, and the heat enchanger 16.

In the embodiment of FIG. 1, the reference or datum pressure in the power supply unit 10 is determined by the maximum temperature of the liquid chlorine in the chlorine reservoir 68. The pressure is advantageously about 7 to 25 atmospheres, and this pressure controls the temperatures in the regenerator 14, wherein the corresponding temperature range is about 280-330° C. although the useful temperature range exceed these limits. The dissociation of the antimony pentachloride which takes place in the regenerator 14 is endothermic and effectively converts heat to chemical energy. The reaction is illustrated by the following:

(l=liquid, g=gas)
$$SbCl_5(l) \rightarrow SbCl_3(l) + Cl_2(g)$$

The overall net reaction of the galvanic cell portion 12 is the exact opposite of the above reaction and is illustrated by the following:

$$SbCl_3(l) + Cl_2(g) \rightarrow SbCl_5(l)$$

In the anode portion of the galvanic cell reaction, the half cell reaction is summarized as:

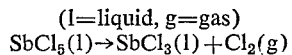
$$SB^{3+} \rightarrow Sb^{5+} + 2e^-$$

or

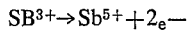
$$SbCl_3 \rightarrow SbCl_3^{++} + 2e^-$$

and the cathode half cell reaction is summarized as:

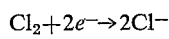
$$Cl_2 + 2e^- \rightarrow 2Cl^-$$

These half cell reactions are able to proceed at a reduced rate even though the electrolyte fluid, to be hereinafter descirbed, within the electrolyte-collector membrane 26 and the anode liquid are at temperatures below the respective melting points. Preferably, however, the electrolyte and the anode liquid are molten during operating conditions so that the temperature of the galvanic cell 12 is desirably above 70° C. but below 150° C.

The electromotive force of the galvanic cell 12 depends upon the cell temperature and upon the activity of the cell reactants and products which influence the free energy of the cell reaction and therefore the useful work available from the cell. As the temperature of the galvanic cell 12 approaches the dissociation temperature in the regenerator 14, the electromotive force approaches zero and a reverse potential may occur if the temperature is further increased so that the system would then be unstable. Therefore, from the standpoint of electromotive force, the cell is to be operated at the lowest feasible temperature consistent with cell current demands.

The activity of the reactants and products are further influenced by concentrations and/or partial pressures. The pressure of the chlorine gas in the cathode chamber 20 is a factor. Also, the ratio of Sb(III) to Sb(V) in the anode liquid has a direct influence upon the electromotive force of the cell. Factors which improve the activity of the reactants also increase the electromotive force. It has been found that maintaining the Sb(III) concentration high favors electromotive force. Also, the ratio of Sb(III) to Sb(V) in the anode fluid controls regeneration conditions including the effective temperature and pressure, while the change of this ratio during the discharge of the cell depends upon the circulation rate of the anode fluid through the anode chamber 24 relative to the cell current.

The maximum temperature in the regenerator 14 is the boiling temperature of the regenerated anode liquid at a particular pressure, and these conditions limit the ultimate ratio of Sb(III) to Sb(V) attainable in the regenerator 14 which also exerts a limiting influence of the cell electromotive force. Since the boiling temperature of antimony trichloride is close to the temperature required for nearly complete dissociation of antimony pentachloride into antimony trichloride and chlorine gas, factors which maintain the temperature of the regenerator below the boiling temperature of antimony chloride and yet at temperatures which provide for the nearly complete dissociation to antimony trichloride are highly desirable. One such factor is the particular solution of non-volatile ionic solutes which occurs upon equilibration of the electrolyte contained within the electrolyte membrane 26 with the anode liquid, which increases the boiling point of the anode liquid for a particular pressure. When all factors which improve the electromotive force of the galvanic cell 12 are effectively applied, the cell electromotive force approaches about 0.7 volt and potentials above 0.65 volt are common.

One of the important novel features of the device 10 is the construction of the collector-electrolyte membrane 26, which is shown in detail in FIGS. 7 and 8. The membrane 26 has an electrochemically active area 88, which generally corresponds to the area of the cathode chamber 20 and anode chamber 24 of FIG. 1, and in the illustrated embodiment may be circular. Membrane 26 further includes an annular structural area 90, which corresponds to generally to the area of the electrolyte membrane 26 which is held between the cathode cap 18 and the anode cup 22 to provide a seal. Referring particularly to FIG. 8, the active area 88 comprises a layer of an inert porous media 92 which is saturated with a suitable electrolyte. If the cathode cap 18 and anode cup 22 are placed on opposite sides of the porous media 92, they become the respective cathode and anode collectors. A greatly improved current density results by placing the cathode collector 38 directly on the surface of the porous media 92 and further improvements result by placement of a corresponding anode collector 40 on the opposite surface of the inert media 92. Desirably, thin catalyst layers 98 and 100 are interposed between the collectors 38 and 40 and the inert media 92.

The inert media 92 is to be readily wetted by the electrolyte and its porosity is to be at a maximum consistent with structural integrity. The pore size of the media 92 is to be sufficiently small so as to contain the electrolyte, while being sufficiently large to permit migration of the chloride ions therethrough from the cathode gas. Examples of suitable inert porous compositions include asbestos fibers, glass fibers, or mixtures of asbestos fibers and glass fibers, which are preferably reinforced with a fluorocarbon resin, such as polytetrafluoroethylene, in an amount of about 10-75 percent by weight with the preferred amount being about 35 percent. The surface tension between the electrolyte and cathode gas is typically 35 dynes per centimeter. The permissible effective pore diameters in the inert porous media desirably ranges from about 0.02 micron to about 50 microns, preferably about 1 micron. The pore diameter is desirably reduced if the composition of the media 92 is changed to cause poorer wetting thereof by the electrolyte, as when the content of the fluorocarbon resin is increased. Thus one function of the asbestos fibers or glass fibers is to assure effective wetting. The inert porous media 92 is as thin as is consistent with structural integrity and usually ranges in thickness from about 25 microns to 500 microns, preferably about 125 microns.

The structural area 90 of the electrolyte is not porous. Desirably, the structural area 90 is of glazed ceramic, corresponding to an active area of porous ceramic. A preferred composition is fluorocarbon resin reinforced by asbestos fibers, glass fibers, or a combination of asbestos and glass fibers, wherein the fluorocarbon resin content is about 50 percent or more by weight.

The cathode collector 38 and anode collector 40 also require porous structures and both are electronic conductors to carry cell current with negligible voltage drop. Particularly satisfactory materials for these porous structures include nickel, Monel tantalum and graphite or carbond. Another suitable material is a composition of graphite or carbon particles bonded with fluorocarbon resin, with the preferred content of graphite or carbon being about two-thirds by weight. The porosity of the collectors 38 and 40 is as great as compatible with structural integrity and with current carrying capacity. For the cathode collector 38, it is preferable that the pore size be heterogeneous but large enough to pass the chloride ions. Preferably, however, most of the pore volume is represented by pores of sufficient effective diameters so that they do not become saturated with the electrolyte against the differential pressure head furnished by the liquid chlorine in the reservoir 68. Preferably, the effective pore diameter of most of the pore volume is greater than 50 microns. The preferred thickness for the cathode collector 38 and the anode collector 40 is about 50 microns. Factors, as those which provide ready circulation of $SbCl_3$ through the collector, controlling the pore size of the anode collector 40, enable suitable performance in a much greater range of diameters. For example, 50 micron diameter pores are suitable.

The catalyst layers 98 and 100 are carbon in a high surface area form, with or without the addition of small quantities of platinum metals. The purpose of the catalyst layers 98 and 100 is to reduced polarization effects other than concentration polarization. The thickness of these layers is desirably 25 microns or less.

The electrolyte which saturates the porous media 92 and wets part of the surface of the cathode collector 38 as well as the catalyst layers 98 and 100 is desirably a composition of alkali metal chlorides, alkaline earth chlorides, tetra-alklammonium chlorides, aluminum chloride, and antimony chlorides. A particular composition for the electrolyte is a eutectic formed from sodium chloride, potassium chloride, and aluminium chloride, which eutectic mixture has been equalibrated with the anode liquid and contains antimony trichloride and antimony pentachloride. Such an electrolyte is less dense than either the regenerated anode liquid or the spent anode liquid with the melting point is below 100° C. The electrolyte is highly ionic with a specific conductivity which approaches 0.2 $ohm^{-1}/cm^{-1}$ as the temperature is raised above the melting point. Although other compositions may be used as the electrolyte, desirably all contain the antimony chlorides in a near equilibrium amount. The lower density of the electrolyte, the differential pressure due to the head of the liquid chlorine, and the selection of pore sizes and materials for the inner porous media 91 and cathode collector 38 combine to assure that the electrolyte remains in the pores of the inert porous media against the slight upward force of the anode fluid and thus properly performs the functions of ionic conduction.

Many galvanic cells such as shown in FIG. 1 may be operated by a single regenerator 14. The galvanic cells may be arranged in series connection, in parallel connection, or in combination. Referring to FIG. 8, a series connection between galvanic cells is illustrated. Metal diaphragms 102 separate the anode chamber 24 from the cathode chamber 20 of an adjacent cell. The metal diaphragm 102 is an electronic conductor and serves as the electrical connection between cells by providing contact with the respective collectors 38 and 40. Embossing points 104 are provided in the metal diaphragm and provide physical supports for the membrane. A suitable manifold system for circulating the anode liquid through all the anode chambers and for circulating chlorine gas to all the cathode chambers may be provided in the structural areas 90 of the membranes 26 and the diaphragms 162. Nickel, Monel, and tantalum are particularly satisfactory materials for use as diaphragms 102. It is to be understood that non-metals may be used for the diaphragms 102, provided that the requirements of acting as a physical barrier and of electrical conduction are met.

The described heat regenerated electrochemical power supply device 10 converts heat to electrical energy with a high degree of efficiency, the maximum efficiency being about 30% of the input heat and efficiency at maximum power being about 16% of the input heat. Specific energy and specific power are above the ranges of present commercial batteries and in the range of internal combustion engines. These highly desirable results are obtained by the many described novel features of the invention. Antimony pentachloride and antimony trichloride are the major components of the anode fluid and the ratio between these components varies from being substantially all antimony trichloride when in the completely regenerated state to a composition which corresponds to antimony pentachloride plus dissolved chlorides when in the completely discharged state. As charging and discharging does not affect the anode or cathode structure, as is common with batteries, the complete discharge of the electrochemical power supply has no adverse effects. Complete discharge assists the start-up of the unit 10 since the discharged anode fluid is liquid over a wide range of ambient conditions. In the completely discharged state, the melting point is approximately 3° C. Also, the anode composition may be supercooled and thereby may remain liquid for several degrees below the melting point.

In addition to the antimony chlorides, the anode liquid composition depends upon the particular electrolyte with which the anode fluid is equilibrated. Added components in the anode fluid may vary from a few mole percent and less to several mole percent. The conventional range is a few mole percent for each added component. By maintaining the quantity of additives at a low level, there is a conservation of added heat since it is not necessary to require additional heating capacity and heat exchange capacity to heat the additives rather than the antimony chlorides. Desirably, the anode liquid is circulated up to a rate which is equal to or greater than twice the stoichiometric rate of the galvanic cell reaction. This circulation rate assures that the electromotive force of the galvanic cell is maintained and that the heat exchange efficiency will be high. The preferred rate of circulation depends upon the particular application and more particularly upon whether high conversion efficiency or maximum power is desirable.

High current density in the galvanic cell section 12 is determined by a number of factors. The electrolyte has high ionic conductivity of chloride ions or chloride bearing ions and the migration path is shortened by maintaining the inert porous media relatively thin, of sufficient porosity, and of sufficient pore size so that the internal resistance of the cell is low. For an electrolyte of specific conductivity of 0.2 $ohm^{-1}$-$cm.^{-1}$ maintained in an inert porous media of 50% effective open cross-section and 250 microns thick, the limiting cell current is about 270 milliamperes per square centimeter, if one half of the conductivity (for alternating current) is due to useful ions. When conditions permit a 125 micron thick membrane, assuming other conditions remain the same, the limiting current is as high as 540 milliamperes per square centimeter and the current for maximum power is approximately 270 milliamperes per square centimeter. On the other hand, if the use of the unit 10 requires a thick, tough, inert porous media, the additional thickness, reduced porosity, and lowered wetting by the electrolyte may combine to reduce the limiting current to a value below 50 milliamperes per square centimeter. Reduced operating temperatures have a similar or even more deleterious effect, as does an unsatisfactory composition which reduces the ionic conductivity for useful ions.

Concentration polarization of the cell 12 is reduced by eliminating flooding of the cathode collector and by a design which permits the flow of the anode fluid to penetrate the anode collector. Polarization resulting from high activation energy by an intermediate in either half cell reaction is countered by the catalyst layer. The proper selection of anode and cathode collector materials also assists in countering polarization. It is to be understood that the catalyst materials may be incorporated as components of the collectors.

Maximum operation of the regenerator 14 is required when the anode liquid is the most depleted in antimony trichloride and the most rich in antimony pentachloride. At this time, there is more antimony pentachloride to dissociate and there is an equivalent ratio of chlorine gas in the anode liquid being heated which results in an increased circulation rate, providing an inherent self-regulating phenomena.

The high performance of the galvanic cell contributes a favorable specific energy and specific power of the power supply. In the stacked arrangement of cells, as shown in FIG. 8, as many as thirty or more cells per linear inch of active volume may be constructed. Favorable viscosity and heat transfer properties of the anode fluid as well as generally favorable densities are other factors which contribute to the high value of specific power. The power supply unit 10 is desirably operated in an upright orientation in a gravity field, either natural or induced.

The following examples are provided to illustrate the operation of specific embodiments of my heat regenerated electric chemical supply, but it is to be understood that there is to be no limitation of the scope of invention by the concentrations, temperatures, materials used, or other operating conditions specified in these examples.

EXAMPLE I

An anhydrous electrolyte composition consisting of 70% $AlCl_3$, 10% NaCl, 15% KCl, with the remaining 5% being principally $MgCl_2$, $CaCl_2$, and LiCl was prepared and added to $SbCl_5$ in a dry atmosphere to give a composition which was 59% $SbCl_5$ on a weight basis. Upon heating the composition melted and separated into two phases, the lighter phase containing a bulk of the $AlCl_3$, the alkali metal chlorides, and the alkaline earth chlorides. Upon further heating $Cl_2$ was evolved principally from the heavy phase with the result that this heavy phase converted principally to $SbCl_3$. The two phases were mutually saturated with components of the other phase. The lighter phase served as the electrolyte and was used to saturate a membrane containing 60% fluorocarbon resin and 40% asbestos fibers which had been sintered under pressure. The heavy phase served as the anode fluid after the addition of some 15% of $SbCl_5$. A small amount of $SbCl_5$ was also used to treat the surface of the cathode collector, a disk of porous nickel formed by compressing 300 mesh nickel powder and sintering. These components were assembled into a small system and all the inert atmosphere was replaced by flushing with dry $Cl_2$ gas. The system was then sealed. Upon heating the regenerator with a small alcohol lamp and also heating the cell portion to about 100° C. a voltage began to develop. With strong heating of the regenerator this voltage built up and was finally steady at 0.25 volt with a current of 25 microamperes.

EXAMPLE II

In a similar experiment with the same system as Example I, the membrane had a composition of 40% fluorocarbon resin and 60% asbestos fiber and had a thin conductive layer of graphite, containing 40% fluorocarbon resin, on the anode side and the entire system was flushed with $Cl_2$ gas after assembly but before the addition of the anode liquid, which in this case was primarily $SbCl_5$ (the condition expected from complete discharge of the cell). Upon initial warming of the cell portion and heating of the regenerator the cell gave a reverse potential, the cathode being negative, of 0.15 volt. When the regenerator continued to be heated this voltage gradually dissipated and finally a voltage of 0.25 was attained in the forward direction, cathode positive, at a current of 25 microamperes. The initial reverse voltage was attributed to preferential adsorption of $Cl_2$ in the conductive layer of the membrane. This was gradually neutralized by $SbCl_3$ formed in the regenerator from the $SbCl_5$.

While in the foregoing there has been provided a detailed description of various embodiments of the present invention, it is to be understood that all equivalents obvious to those having skill in the art are to be included within the scope of the invention as claimed.

What I claim and desire to secure by Letters Patent is:

1. An electrochemical power supply device for supplying electrons to an external circuit, comprising: means defining an anode chamber; means for circulating an anode fluid comprising antimony trichloride to said anode chamber; means defining a cathode chamber; means for supplying a cathode gas comprising chlorine to said cathode chamber; means for separating said anode fluid and said anode chamber from said cathode gas and said cathode chamber while permitting passage of those ions of the cathode gas formed in said cathode chamber, with the result that said anode fluid releases electrons to said anode chamber defining means for passage therethrough to said cathode chamber defining means by movement through said external circuit, said cathode gas receives said electrons from said cathode chamber defining means for forming said ions and said ions combine with said anode fluid to form a partially modified anode fluid comprising primarily antimony pentachloride; and means for thermally disassociating said partially modified anode fluid into the original anode fluid and cathode material for recirculating thereof to said anode chamber and said cathode chamber respectively, said thermal disassociating means including a heat source and means for conducting heat from said heat source to said disassociating means, said heat conducting means including an upright first annular chamber, a central upright duct positioned substantially concentrically within said annular chamber for permitting the downward passage of said partially modified anode fluid, a second annular chamber is defined between said central upright duct and said first annular chamber and communicating with said central upright duct for permitting the upflow of said anode fluid therein, whereby as heat is imparted to said partially modified anode fluid the partially modified anode fluid disassociates into said cathode gas and said anode fluid.

2. The device of claim 1 wherein an outlet for the disassociated cathode gas is provided at the upper end portion of said heating duct and an outlet is provided at said upper end portion of said heating duct for permitting the passage of said disassociated anode fluid therefrom.

3. An electrochemical power supply device for supplying electrons to an external circuit, comprising: means defining an anode chamber; means for circulating an anode fluid comprising antimony trichloride to said anode chamber; means defining a cathode chamber; means for supplying a cathode gas comprising chlorine to said cathode chamber; means for separating said anode fluid and said anode chamber from said cathode gas and said cathode chamber while permitting passage of those ions of the cathode gas formed in said cathode chamber, with the result that said anode fluid releases electrons to said anode chamber defining means for passage therethrough to said cathode chamber defining means by movement through said external circuit, said cathode gas receives said electrons from said cathode chamber defining means for forming said ions and said ions combine with said anode fluid to form a partially modified anode fluid comprising primarily antimony pentachloride; means for thermally disassociating said partially modified anode fluid into the original anode fluid and cathode material for recirculating thereof to said anode chamber and said cathode chamber respectively; a conduit for circulating said cathode gas from said disassociating means; means for condensing said cathode gas to the liquid state; a reservoir for said cathode liquid prior to introduction of said cathode liquid to said cathode chamber, the reservoir being located above said cathode chamber, said cathode liquid passing from the liquid state to the gaseous state upon entry into said cathode chamber; passage means connecting said reservoir and said cathode chamber; and means for maintaining said reservoir at a temperature below the boiling point of said liquid cathode material whereby a pressure head is maintained in said cathode chamber by the liquid cathode material in said reservoir and in said passage means.

References Cited

UNITED STATES PATENTS

| | | | |
|---|---|---|---|
| 3,009,327 | 11/1961 | Weil | 136—86 X |
| 3,043,898 | 7/1962 | Miller et al. | 136—86 |
| 3,088,990 | 5/1963 | Rightmire et al. | 136—86 |
| 3,126,302 | 3/1964 | Drushella | 136—86 |
| 3,235,473 | 2/1966 | Le Duc | 136—86 X |
| 3,245,836 | 4/1966 | Agruss | 136—86 X |
| 3,297,484 | 1/1967 | Niedrach | 136—86 |
| 3,331,706 | 7/1967 | Jenkins | 136—86 |

FOREIGN PATENTS

| | | |
|---|---|---|
| 1,299,346 | 6/1962 | France. |
| 1,358,600 | 9/1964 | France. |
| 959,032 | 5/1964 | Great Britain. |

OTHER REFERENCES

Astia AD 29,941, July 5, 1963, Report, McCully, titled Chemical Conversion of Waste Heat to Electrical Energy.

Astia AD 286,686, June 6, 1962, Report CEEN Thermaly Galvanic Cell, pp. 16–117, and front pages.

ALLEN B. CURTIS, Primary Examiner

U.S. Cl. X.R.

136—146, 155